United States Patent [19]

Nemoto

[11] Patent Number: 4,735,452

[45] Date of Patent: Apr. 5, 1988

[54] ARTICLE GRIPPER ASSEMBLY

[75] Inventor: Kouichi Nemoto, Miho, Japan

[73] Assignee: Texas Instruments Incorporated, Dallas, Tex.

[21] Appl. No.: 944,640

[22] Filed: Dec. 19, 1986

[51] Int. Cl.⁴ ............................ B66C 1/66; B25J 15/08
[52] U.S. Cl. ................................ 294/119.1; 294/86.4; 414/730
[58] Field of Search .................. 294/119.1, 88, 86.4, 294/103.1, 67.33; 414/730, 739, 741, 749, 786, 740, 621, 653, 667; 901/45

[56] References Cited

U.S. PATENT DOCUMENTS

| 4,605,255 | 8/1986 | Olson | 414/621 |
| 4,616,971 | 10/1976 | Matrone | 294/86.4 |
| 4,661,037 | 4/1987 | Seugino et al. | 294/86.4 |

Primary Examiner—James B. Marbert
Attorney, Agent, or Firm—Gary C. Honeycutt; N. Rhys Merrett; Mel Sharp

[57] ABSTRACT

An article gripper assembly comprising a support member, a movable base member movable back and forth in a predetermined direction with respect to the support member, a pair of finger members movable toward and away from each other with respect to the base member in opposite directions parallel with the predetermined direction, a rotatable member rotatable about an axis fixed with respect to the base member and substantially perpendicular to the predetermined direction, link members coupling the rotatable member operatively to the finger members for converting rotation of the rotatable member in one direction about the axis of rotation of the rotatable member into movement of the finger members toward each other with respect to the base member and rotation of the rotatable member in the opposite direction about the axis of rotation of the rotatable member into movement of the finger members away from each other with respect to the base member, a pair of centering members fixedly positioned with respect to the support member, and a centering unit rotatable with the rotatable member about the axis of rotation of the rotatable member and engageable with the centering members, the centering unit having about the axis of rotation of the rotatable member and engageable with the centering members, the centering unit having about the axis of rotation of the rotatable member at least two different angular positions in each of which the centering unit is engaged by the centering members so that the base member is locked to the support member.

4 Claims, 4 Drawing Sheets

ARTICLE GRIPPER ASSEMBLY

FIELD OF THE INVENTION

The present invention relates in general to an article handling apparatus and, particularly, to a gripper assembly of a robot used for the handling of articles. A typical example of such a robot is used for semiconductor fabrication processes.

BACKGROUND OF THE INVENTION

In order to have an article manipulated correctly and in a stable state in a robot, it is important that the article be strictly aligned with or centered with respect to the gripper assembly which forms part of the robot. Difficulties are however encountred to acheive such strict alignment between the gripper assembly and the article to be handled. If the article has failed to be correctly centered with respect to the gripper assembly, one of the fingers forming part of the gripper assembly would be first brought into contact with the article and cause the article to unduly move with respect to the gripper assembly and would thus impart an unnecessary force or impact to the article. If the article to be handled is implemented a basket containing wafers, the wafers may be caused to slide on the surfaces of the basket supporting the wafers and produce fine particulates or may be dislocated from the proper positions on the basket.

A prime object of the present invention is to provide an improved gripper assembly which is free from these problems of a known gripper assembly, typically a gripper assembly of a robot used for semiconductor fabrication processes.

SUMMARY OF THE INVENTION

In accordance with the present invention, there is provided a gripper assembly comprising (a) a support member, (b) a movable base member movable back and forth in a predetermined direction with respect to the support member, (c) a pair of finger members movable toward and away from each other with respect to the base member in opposite directions parallel with the predetermined direction, (d) a rotatable member rotatable about an axis fixed with respect to the base member and substantially perpendicular to the predetermined direction, (e) coupling means coupling the rotatable member operatively to the finger members for converting rotation of the rotatable member in one direction about the axis of rotation of the rotatable member into movement of the finger members toward each other with respect to the base member and rotation of the rotatable member in the opposite direction about the axis of rotation of the rotatable member into movement of the finger members away from each other with respect to the base member, (f) a pair of centering members fixedly positioned with respect to the support member, and (g) centering means rotatable with the rotatable member about the axis of rotation of the rotatable member and engageable with the centering members, the centering means having about the axis of rotation of the rotatable member at least two different angular positions in each of which the centering means is engaged by the centering members so that the base member is locked to the support member. In a preferred embodiment of a gripper assembly thus constructed in accordance with the present invention, the centering members are spaced apart from each other in a direction parallel with the aforesaid predetermined direction and the centering means comprises a rotor member positioned between the centering members and rotatable about an axis aligned with the axis of rotation of the rotatable member, and at least one pair of rollers carried by the rotor member and located substantially in diametrically opposed relationship to each other across the axis of rotation of the rotor member, the rollers being engageable with the centering members, respectively, when the centering means is in one of the two different angular positions thereof.

BRIEF DESCRIPTION OF THE DRAWINGS

The drawbacks of a prior-art gripper assembly and the features and advantages of a gripper assembly according to the present invention will be more clearly understood from the following description taken in conjunction with the accompanying drawings in which:

FIGS. 7A and 7B are schematic side elevation views showing the position of the work to be handled (FIG. 7A) and the position of the work being handled (FIG. 7B) by the gripper assembly embodying the present invention.

DESCRIPTION OF THE PRIOR ART

Figure 1:
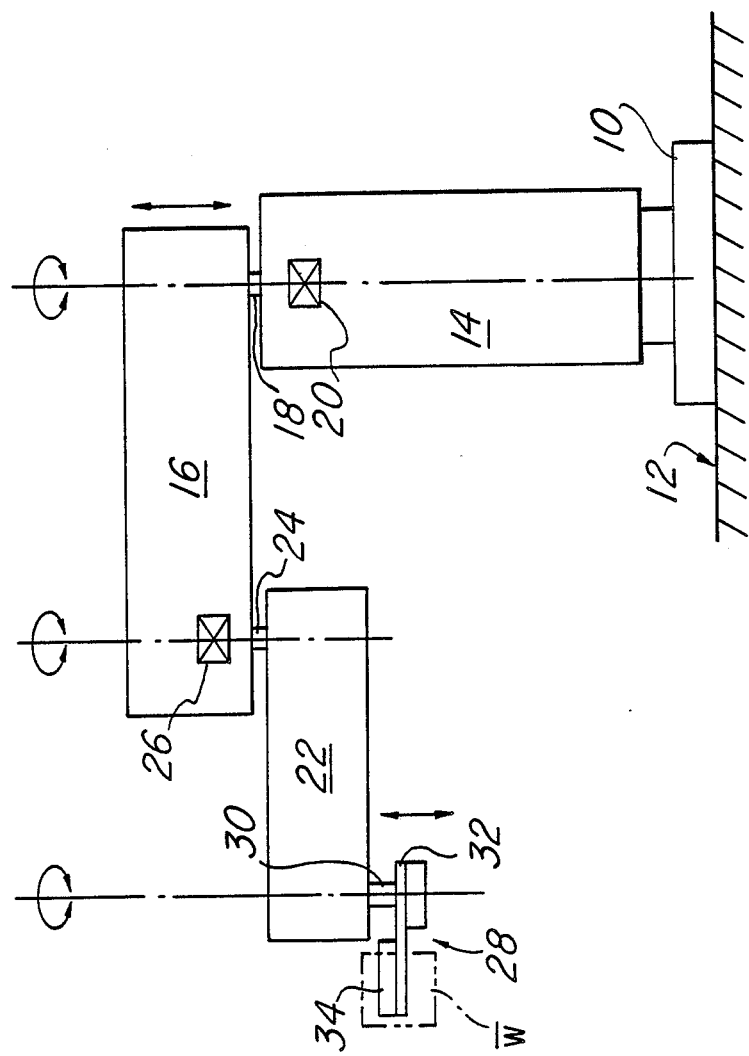
FIG. 1 is a side elevation view showing the general construction of a robot apparatus which includes a gripper assembly to which the present invention appertains.

In FIG. 1 is shown the general construction of a robot apparatus used for the manipulation of semiconductor materials in a clean room. The robot apparatus comprises a pedestal 10 fixedly installed on a floor or base structure 12 and a support structure 14 extending upwardly from the pedestal 10. A first arm structure 16 is cantilevered to a first pivot shaft 18 expending upwardly from the support structure 14. The pivot shaft 18 is connected to the output shaft of a harmonic-motion drive unit 20 incorporated in the support structure 14 to drive the arm structure 16 for oscillatory motion with respect to the support structure 14 about the center axis of the shaft 18. The first arm structure 16 as a whole is movable with respect to the support structure 14 upwardly and downwardly along the pivot shaft 20 and has a second arm structure 22 suspended from its leading end portion by means of a second pivot shaft 24 extending downwardly from the arm structure 16. The second pivot shaft 24 is connected to the output shaft of a harmonic-motion drive unit 26 incorporated in the first arm structure to drive the second arm structure 22 for oscillatory motion with respect to the arm structure 16 about the center axis of the shaft 24. The second arm structure 22 in turn has a gripper structure 28 suspended from from its leading end portion by means of a shaft 30 extending downwardly from the arm structure 22. The gripper structure 28 largely consists of a horizontal support plate 32 attached to the shaft 30 and movable with respect to the arm structure 22 upwardly and downwardly along the shaft 30 and has mounted thereon a gripper assembly 34 having a pair of finger members adapted to have a work W gripped therebetween.

In having the work W handled correctly and in a stable state by the gripper assembly 34 of the robot apparatus thus constructed, it is important that the work W be strictly aligned with or centered with respect to the gripper assembly 34. Laborious and time-consuming work has however been required to achieve such strict alignment between the work W and the gripper assembly. In case the work fails to be correctly centered with respect to the gripper assembly or the fingers of the gripper assembly happen to overshoot or undershoot the work, the finger located closer to the work would first contact the work and cause the work to drag on the support plate and would thus impart an unnecessary force or impact to the work. If the work is a basket containing a set of wafers as used in a semiconductor fabrication process, the wafers may be caused to slide on the surfaces of the basket supporting the wafers and produce fine particulates and/or may be dislodged from the proper positions within the basket. The present invention contemplates provision of an improved gripper assembly to eliminate these problems which have thus far been inherent in a robot apparatus used for semiconductor fabrication processes.

DESCRIPTION OF THE PREFERRED EMBODIMENTS

Figure 2:
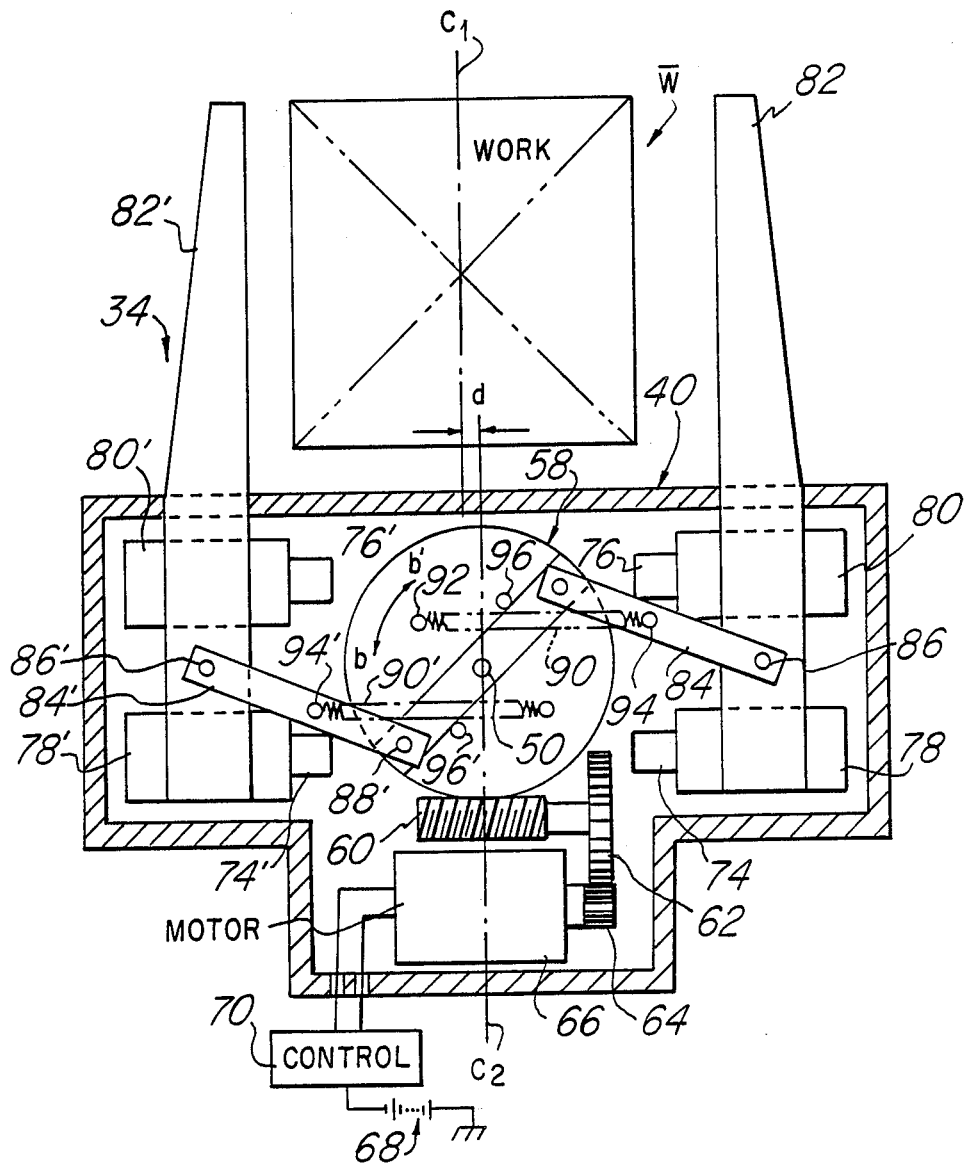
FIG. 2 is a plan view showing, partly in section, a preferred embodiment of a gripper assembly according to the present invention.
Figure 3:
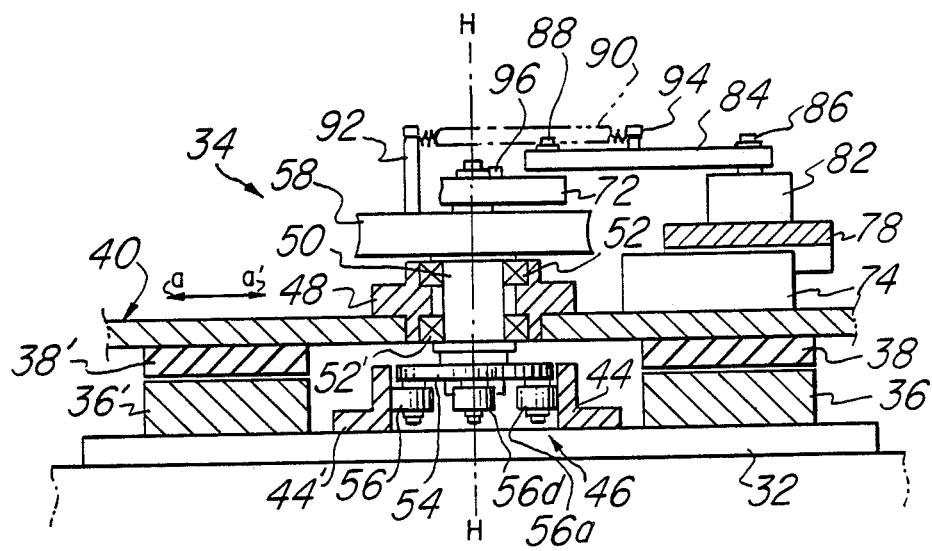
FIG. 3 is a rear elevation view showing, also partly in section, part of the embodiment illustrated in FIG. 2.

Referring to FIGS. 2 and 3, the gripper assembly 34 embodying the present invention forms part of the gripper structure 28 of the robot apparatus shown in FIG. 1 and is provided on the support plate 32 which also forms part of the gripper structure 28. On the support plate 32 are provided two pairs of stationary guide blocks securely attached to the upper face of the support plate 32. These stationary guide blocks consist of a first pair of guide blocks 36 and 36' which are spaced apart in parallel from each other as shown in FIG. 2 and a second pair of guide blocks (not shown) which are spaced apart in parallel from each other and from the guide blocks 36 and 36', respectively. On these four guide blocks are respectively provided slide members which consist of a pair of slide members 38 and 38' slidable on the guide blocks 36 and 36', respectively, and a pair of slide members (not shown) which are slidable on the second pair of guide blocks, respectively. These four slide members in turn have fixedly mounted thereon a movable base plate 40 which is movable leftwardly and rightwardly in the drawings, viz., in opposite directions in which the guide blocks of each pair are spaced apart from each other as indicated by arrows a and a' in FIG. 2. The movable base plate 40 thus movable with respect to the support plate 32 has a central aperture 42 formed therein. In the description to follow, the guide blocks not visible in FIGS. 2 and 3 will also be represented by reference numerals 36 and 36' and likewise the slide members invisible in FIGS. 2 and 3 will also be represented by reference numerals 38 and 38'. In the following description, directions parallel with the directions of arrows a and a' shown in FIG. 2 will be referred to as "lateral" directions of the gripper assembly 34 under consideration.

Figure 4A:
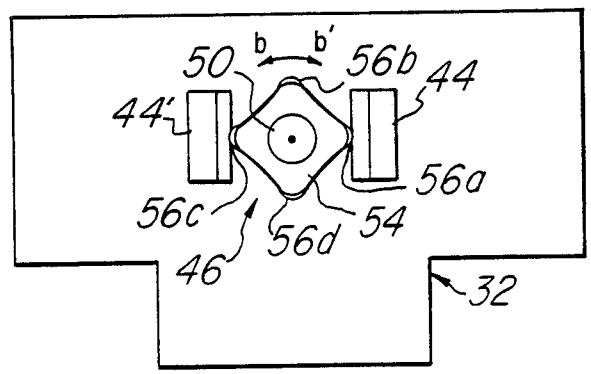
FIGS. 4A, 4B and 4C are plan views schematically showing different rotational positions of the centering unit which form part of the embodiment shown in FIGS. 2 and 3.
Figure 4B:
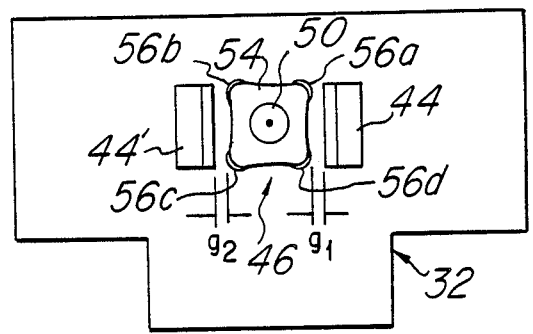
Figure 4C:
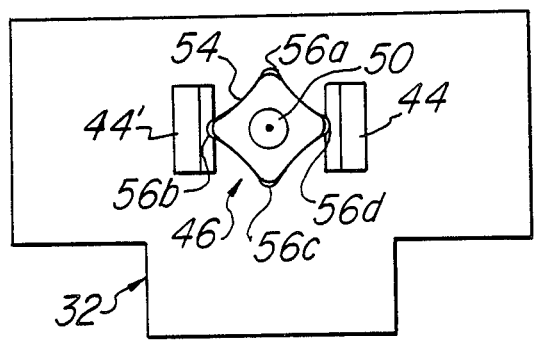

On the support plate 32 is further provided a pair of centering members 44 and 44' which are located centrally of the four guide blocks 38 and 38'. These centering members 44 and 44' are fixedly attached to the support plate 32 and have vertical bearing surfaces normal to the upper face of the support plate 32. The vertical bearing surfaces of the centering members 44 and 44' are spaced apart in parallel from each other below a generally central area of the base plate 40. On this central area of the base plate 40 is provided a centering unit 46 which is arranged in conjunction with the centering members 44 and 44' to have the movable base plate 40 locked into or unlocked out of a predetermined position with respect to the underlying support plate 32. The centering unit 46 comprises a generally cylindrical journal member 48 securely fitted to the base plate 40 through the central aperture 42 therein. The journal member 48 has a drive shaft 50 journalled in bearings 52 and 52' retained in the journal member 48. The drive shaft axially extends downwardly below the aperture 42 in the base plate 40 and has a lower end portion between the centering members 44 and 44'. The centering unit 46 further comprises a roller carrier implemented by a rotor plate 54 secured to the lower end portion of the drive shaft 50 and four centering rollers 56a, 56b, 56c and 56d each having a vertical axis of rotation parallel with the bearing surfaces of the centering members 44 and 44' as will be better seen from FIG. 4A. These rollers 56a, 56b, 56c and 56d are arranged so that the respective axes of rotation thereof are located symmetrically with respect to the center axis of the drive shaft H-H' of the drive shaft 50. Thus, diametrically opposed two of the rollers 56a to 56d may be concurrently engaged with the bearing surfaces of the centering members 44 and 44', respectively, as shown in FIGS. 4A and 4C or all of the rollers may be concurrently disengaged from the centering members 44 and 44' as shown in FIG. 4B depending upon the angular position of the rotor plate 54 about the center axis H—H of the shaft 50 with respect to the centering members 44 and 44'. While the rotor plate 56 is thus assumed to have four rollers, the centering unit of a gripper assembly according to the present invention may include any desired even number of rollers which consist of pairs of rollers located in diametrically opposed relationship to each other across the center axis H—H of the drive shaft 50.

The drive shaft 50 extends upwardly from the journal member 48 and is securely coupled at its upper end to a worm wheel 58. As shown in FIG. 3, the worm wheel 58 is journalled in a suitable bearing arrangement provided on the support plate 32 and is held in mesh with a worm 60 integral with a reduction gear 62. The reduction gear 62 is in mesh with a drive gear 64 which in turn is connected to or forms part of the output shaft of a reversible motor unit 66 supported on the support plate 32. The motor unit 66 is electrically connected across a d.c. power source 68 through a suitable control circuit 70. When the motor 66 is in operation, the worm 60 is thus driven for rotation through the drive gear 64 and reduction gear 62 and drives the worm wheel 58 about the center axis H—H thereof either counterclockwise as indicated by arrow b or clockwise as indicated by arrow b'. The drive shaft 50 extends upwardly through the worm wheel 58 and has rotatably supported at its upper end an elongated rotatable link member 72 which extends diametrically of the worm wheel 58.

It will be apparent that the combination of the gears 62 and 64 providing driving connection from the motor 66 to the worm 60 in the embodiment herein shown may be substituted by any other form of drive transmission means such as, for example, a belt and pulley mechanism or a chain and sprocket wheel arrangement. Similarly, the combination of the worm wheel 58 and worm 60 may be replaced with any other form of drive transmission means such as a combination of spur or helical gears, a rack and pinion arrangement or an in-line drive mechanism using a motor arranged coaxially to the link member 72.

On the base plate 40 are provided two pairs of guide blocks securely attached to the upper face of the base plate 40. These guide blocks consist of a pair of guide blocks 74 and 74' which are spaced apart in parallel from each other and a pair of guide blocks 76 and 76' which are spaced apart in parallel from each other and from the guide blocks 74 and 74', respectively. On these four guide blocks 74, 74', 76 and 76' are respectively provided slide members which are movable with respect to the base plate 40 in lateral directions of the gripper assembly 34. The slide members thus associated with the guide blocks 74, 74', 76 and 76' consist of a pair of slide members 78 and 78' slidable on the guide blocks 74 and 74', respectively, and a pair of slide members 80 and 80' which are slidable on the guide blocks 76 and 76', respectively. The two slide members 78 and 80 spaced apart from each other in directions perpendicular to lateral directions of the gripper assembly 34 have fixedly mounted thereon a finger member 82 and likewise the two remaining slide members 78' and 80' have fixedly mounted thereon a finger member 82'. The two finger members 82 and 82' extend forwardly from the slide members 78/80 and 78'/80', respectively, in directions perpendicular to lateral directions of the gripper assembly 34 and have leading end portions outside the base plate 40 as will be seen from FIG. 3.

The finger members 82 and 82' thus arranged in the gripper assembly 34 are coupled to the rotatable link member 72 by means of outer link members 84 and 84'. One outer link member 84 is pivotally connected adjacent one end thereof to the associated finger member 82 by means of a pivot pin 86 and is thus rotatable about the center axis of the pin 86 and the other outer link member 84' is pivotally connected adjacent one end thereof to the associated finger member 82' by means of a pivot pin 86' and is rotatable about the center axis of the pin 86'. The two finger members 84 and 84' are further pivotally connected adjacent the other ends thereof to opposite end portions, respectively, of the intermediate link member 72 on the worm wheel 58 by means of pivot pins 88 and 88', respectively, and are thus rotatable about the center axes of the pins 88 and 88'. The pivot pins 88 and 88' thus provided on the link member 72 are located in diametrically opposed relationship to each other across the center axis H—H of the worm wheel 58.

Suitable biasing means is provided to have the outer link members 84 and 84' urged to turn clockwise about the pivot pins 88 and 88' on the intermediate link member 72. In the embodiment herein shown, such biasing means comprises a helical tension spring 90 anchored at one end to the worm wheel 58 by means of a retainer pin 92 and at the other to an intermediate portion of the link member 84 by means of a retainer pin 94, and a helical tension spring 90' anchored at one end to the worm wheel 58' by means of a retainer pin 92' and at the other to an intermediate portion of the link member 84' by means of a retainer pin 94'. With the outer link members 84 and 84' thus biased by the springs 90 and 90', the intermediate link member 72 is urged to turn counterclockwise in FIG. 3 about the center axis H—H of the drive shaft 50. Stop elements 96 and 96' are thus fixedly located on the worm wheel 58 to preclude the link member 72 from being turned counterclockwise beyond a predetermined angular position with respect to the worm wheel 58. As will be understood as the description proceeds, the intermediate link member 72 which is herein assumed to be rotatable with respect to the worm wheel 58 is urged to engage the stop elements 96 and 96' by the forces of the springs 90 and 90', respectively, and is thus rotatable together with the worm wheel 58. Such a link member 72 may however be substituted by a member securely attached to or integral with the worm wheel 58 if desired. In this instance, the stop elements 96 and 96' can be dispensed with. The link members 72, 84 and 84' and the springs 90 and 90' arranged as above described implement a crank mechanism converting a rotational motion of the worm wheel 58 into linear movements of the fingers members 82 and 82'. Such a crank mechanism may be substituted by any other form of known proportional or non-proportional rotary-to-linear motion translating means.

Figures 5A, 5B:
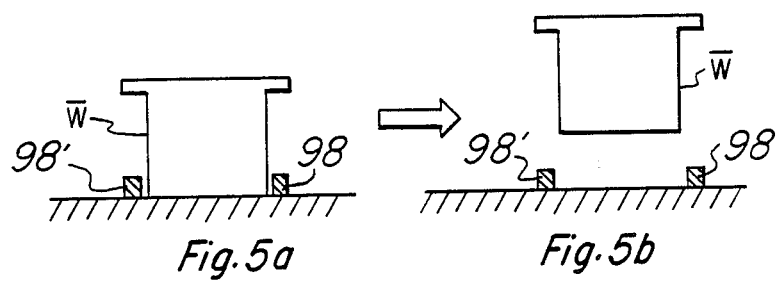

Description will now be made in regard to the manner of operation of the gripper assembly 34 thus constructed and arranged in accordance with the present invention. It is assumed that, before the gripper assembly 34 is initiated into motion, the worm wheel 58 is held in an angular position having the diametrically opposed two rollers 56a and 56c of the centering unit 46 are engaged by the bearing surfaces of the centering members 44 and 44', respectively, as shown in FIG. 4A. With the two of the rollers 56a to 56d thus held in engagement with the centering members 44 and 44', the drive shaft 50 extending from the centering unit 46 has its center axis H—H fixed with respect to the movable base plate 40, which is accordingly fixedly held in position with respect to the support plate 32. The angular position of the worm wheel 58 prior to the start of the gripper assembly 34 is further assumed to be such that the finger members 82 and 82' are held in positions spaced apart from each other a distance close to the maximum possible distance therebetween. The angular position of the worm wheel 58 as shown in FIG. 3 is assumed to approximate such an angular position. On the other hand, the work W to be handled by the gripper assembly 34 is herein assumed by way of example as being implemented by a basket containing a number of wafers (not shown) therein. Such a work W is shown positioned between the finger members 82 and 82' and is assumed to be held in such a position with respect to the support plate 32 by the aid of suitable guide elements 98 and 98' as shown in FIG. 5A. In this instance, the work W is positioned with respect to the guide elements 98 and 98' with a clearance of, for example, plus and minus 1 mm to 2 mm provided between the work and each of the guide elements 98 and 98'. The work W thus positioned will be positioned closer to the finger member 82' than to the finger member 82 with its center line $C_1$ offset from the center line $C_2$ of the gripper assembly 34 per se as shown in FIG. 3 in which the amount of deviation between the respective center lines $C_1$ and $C_2$ is indicated by d.

The control circuit 70 is now actuated to start the motor 60 for operation driving the worm 60 for rotation in one direction about its axis through the gears 64 and 62. The direction in which the worm 60 is thus driven for rotation is herein assumed to be such that the worm wheel 58 is caused to turn in the direction of arrow b, viz., counterclockwise in FIG. 3 about the center axis H—H of the drive shaft 50. As the worm wheel 58 is thus driven for rotation about the center axis H—H of the drive shaft 50, the rotor plate 54 of the centering unit 46 connected to the shaft 50 is also driven for rotation about the center axis H—H of the shaft 50 so that the diametrically opposed two rollers 56a and 56c which have been held in engagement with the centering members 44 and 44', respectively, are disengaged therefrom to provide a gap $g_1$ between the rotor plate 54 and the bearing surface of one centering member 44 and a gap $g_2$ between the rotor plate 54 of the centering unit 46 and the bearing surface of the other centering member 44' as shown in FIG. 4B. The movable base plate 40 is thus movable with respect to the support plate 36 but is maintained in situ with respect to the support plate 36 in the absence of any external forces imparted to the finger members 82 and 82' at this point of time.

As the worm wheel 58 is driven for rotation counterclockwise from the position shown in FIG. 3, the link member 72 is forced against the stop elements 96 and 96' by the forces of the springs 90 and 90' and is caused to turn with the worm wheel 58 about the center axis H—H of the drive shaft 50. The finger members 82 and 82' are accordingly caused to move toward each other along the guide blocks 78/80 and 78'/80', respectively, by means of the outer link members 84 and 84' and the springs 90 and 90', respectively. The movement of the finger members 82 and 82' is guided respectively by the guide blocks 78 and 80 engaging the slide members 74 and 76 and the guide blocks 78' and 80' engaging the slide members 74' and 76'. The finger members 82 and 82' are thus moved toward the work W positioned therebetween, whereupon the finger member 82' which has been positioned closer to the work W first contacts the work W. The finger member 82' brought into pressing contact with the work W is resisted for its further movement by the force resulting from the weight and the static friction of the work W on the support surface so that a force is produced urging the movable base plate 40 to move in the direction of arrow a (FIG. 2). The force causes the movable base plate 40 to move leftwardly with respect to the support plate 36 in the presence of a gap $g_2$ between the rotor plate 54 of the centering unit 46 and the bearing surface of the centering member 44' as noted with reference to FIG. 4B. All the units and members carried on the base plate 40 are thus moved leftwardly of the drawings together with the base plate 40 thus moved. It therefore follows that the finger member 82, which is still located ahead of the work W, is caused to move toward the work W over a distance which is the sum of the distance of movement of the finger member 82 with respect to the base plate 40 and the distance ($g_2$) of movement of the base plate 40 with respect to the support plate 32.

Not only the finger member 82' but also the finger member 82 are in these manners brought into contact with the work W. The gripper structure 28 forming part of the robot apparatus shown in FIG. 1 is then driven to move upwardly with respect to the second arm structure 22 of the robot apparatus so that the work W is raised from the support surface as shown in FIG. 5B. As the worm wheel 58 is further turned about the center axis H—H of the drive shaft 50, the the centering unit 46 shown in FIG. 2 will reach the angular position shown in FIG. 4C. In the angular position of the centering unit 46 shown in FIG. 4C, the diametrically opposed two rollers 56d and 56b in lieu of the rollers 56a and 56c of the centering unit 46 are engaged by the bearing surfaces of the centering members 44 and 44', respectively. The rotation of the centering unit 46 to this angular position is accompanied by the movement of the base plate 40 in the direction of arrow a' (FIG. 2) with respect to the support plate 32. The drive shaft 50 extending from the centering unit 46 now has its center axis H—H fixed for a second time with respect to the movable base plate 40. The movable base plate 40 is accordingly moved back to its initial position with respect to the support plate 32. The finger members 82 and 82' supporting work W are moved together with the base plate 40 with respect to the support plate 32 so that the work W gripped between the finger members 82 and 82' is moved in a lateral direction of the gripper assembly possibly over the distance d shown in FIG. 3 and has its center line $C_1$ correctly aligned with the center line $C_2$ of the gripper assembly 34 as a whole.

While only one preferred embodiment of a gripper assembly according to the present invention have hereinbefore been described and shown, it should be borne in mind that such an embodiment is merely illustrative of the gist of the present invention and is thus subject to modification and change where desired.

What is claimed is:

1. An article gripper assembly comprising
    (a) a support member,
    (b) a movable base member movable back and forth in a predetermined direction with respect to the support member,
    (c) a pair of finger members movable toward and away from each other with respect to said base member in opposite directions parallel with said predetermined direction,
    (d) a rotatable member rotatable about an axis fixed with respect to said base member and substantially perpendicular to said predetermined direction,
    (e) coupling means coupling the rotatable member operatively to said finger members for converting rotation of the rotatable member in one direction about said axis into movement of the finger members toward each other with respect to said base member and rotation of the rotatable member in the opposite direction about said axis into movement of the finger members away from each other with respect to said base member,
    (f) a pair of centering members fixedly positioned with respect to said support member, and
    (g) centering means rotatable with said rotatable member about said axis and engageable with said centering members, the centering means having about said axis at least two different angular positions in each of which said centering means is engaged by said centering members so that said base member is locked to said support member.

2. An article gripper assembly as set forth in claim 1, wherein said centering members are spaced apart from each other in a direction parallel with said predetermined direction and wherein said centering means comprises a rotor member positioned between said centering members and rotatable about an axis aligned with the axis of rotation of said rotatable member, and at least one pair of rollers carried by said rotor member and located substantially in diametrically opposed relationship to each other across the axis of rotation of the rotor member, the rollers being engageable with said centering members, respectively, when said centering means is in one of said two different angular positions thereof.

3. An article gripper assembly as set forth in claim 1, wherein said rotatable member extends perpendicularly to and through the axis of rotation of said rotatable member and wherein said coupling means comprises a pair of link members pivotally connected each at one end to said rotatable member and at the other to said finger members, respectively, and biasing means urging said link members to pivotally move with respect to said rotatable member and to said finger members in directions to move the finger members toward each other with respect to said base member.

4. An article gripper assembly as set forth in claim 1, further comprising a drive shaft rotatable with respect to said base member and connecting said rotatable member to said centering means.

* * * * *